US005108079A

United States Patent [19]

Yonezawa et al.

[11] Patent Number: 5,108,079

[45] Date of Patent: Apr. 28, 1992

[54] HYDRAULIC CLAMP WITH DIRECT OPERATED ROTARY CLAMPING-MEMBER

[75] Inventors: Keitaro Yonezawa; Toshinao Nishimoto, both of Kobe, Japan

[73] Assignee: Kabushiki Kaisha KOSMEK, Kobe, Japan

[21] Appl. No.: 627,745

[22] Filed: Dec. 14, 1990

[30] Foreign Application Priority Data

Dec. 29, 1989 [JP] Japan ..................... 1-340037

[51] Int. Cl.[5] .................... B23Q 3/08

[52] U.S. Cl. .................... 269/24

[58] Field of Search .................... 269/24, 27, 91, 93, 269/32; 92/2, 33

[56] References Cited

U.S. PATENT DOCUMENTS 4,560,152 12/1985 Miller .................... 269/24

4,620,695 11/1986 Vanistendael .................... 269/24

FOREIGN PATENT DOCUMENTS 57-138550 8/1982 Japan .

*Primary Examiner*—Robert C. Watson

*Attorney, Agent, or Firm*—Bacon & Thomas

[57] ABSTRACT

In a hydraulic clamp with a direct operated rotary clamping-member, a clamping-member (6) is fixedly secured to the lower portion of a clamp rod (22) adapted to be actuated by a hydraulic cylinder (12). When the hydraulic cylinder (12) is actuated for clamping, the clamping-member (6) is upward straightly actuated and changed over to a clamping condition (C) after being rotated to a clamping preparation condition (B) from an unclamping condition (A), through a rotary actuation device (13) and the clamp rod (22). The clamp rod (22) is interlockingly connected to a rotary member (27) of the rotary actuation device (13) in the rotatably actuated and slidably lowered state with respect to the rotary member (27).

5 Claims, 5 Drawing Sheets

HYDRAULIC CLAMP WITH DIRECT OPERATED ROTARY CLAMPING-MEMBER

BACKGROUND OF THE INVENTION

1. Field of the Invention

The present invention relates to a hydraulic clamp for use in securing a fixed member such as a metallic mould, a work and the like onto a machine tool such as a press machine, a machining center and the like, and more particularly to a hydraulic clamp of the type adapted to press and secure a fixed member between a frame body of the hydraulic clamp and a clamping-member by straightly advancing the clamping-member after rotating it by means of a clamp rod.

2. Prior Art

As such a hydraulic clamp with a direct operated rotary clamping-member, there has been known the one disclosed in the Japanese Patent Laid Open Publication No. 1982-138550 previously proposed by the inventor of the present invention.

A basic construction of the conventional embodiment, as shown in FIG. 6, is as follows.

A hydraulic cylinder 112 and a rotary actuation device 113 are arranged in series in the upward and downward direction in a frame body 103 of a hydraulic clamp 102.

A clamp rod 122 is extended below a lower wall 103*a* of the frame body 103, adapted to be operatively raised and lowered by means of a piston 116 of the hydraulic cylinder 112 and has a clamping-member 106 fixedly secured to the lower portion of the clamp rod 122.

The rotary actuation device 113 comprises a rotary member 127 fitted to a non-rotary member 128 so as to be spirally movable, and the non-rotary member 128 is supported by the frame body 103 through a supporting portion 129. To the contrary, the rotary member 127 is interlockingly connected to the clamp rod 122 so as to be pushed up by means of an actuation force of the piston 116.

The clamping-member 106 is adapted to be changed over between an unclamping condition A of a lowered position disengaged posture X, a clamping preparation condition B of an intermediate height position engaging posture Y and a clamping condition C of a raised position engaged posture Z in order.

The clamping-member 106 is adapted to take the unclamping condition A under a lowered returned condition wherein the piston 116 is located at a lowered position.

When the piston 116 is pushed up from the aforementioned lowered position to an intermediate height position, the rotary member 127 is rotated through a spiraling engagement with the non-rotary member 128 to rotate the clamp rod 122 while being pushed up by means of an actuation force of the piston 116, so that the clamping-member 106 is changed over to the clamping preparation condition B.

When the piston 116 is pushed up from the aforementioned intermediate height position to the raised position, the rotary member 127 and the non-rotary member 128 are simultaneously pushed up by means of the actuation force of the piston 116 so as to actuate the clamping-member 106 to the clamping condition C.

In the above-mentioned basic construction, conventionally the construction of a portion for interlockingly connecting the clamp rod 122 and the rotary member 127 was as follows. That is, as shown in FIG. 6, both these component members were integrally combined by fixedly securing the lower portion of the rotary member 127 to the upper portion of the clamp rod 122.

The hydraulic clamp 102 having the above-mentioned construction is used, for example as follows.

As shown in FIG. 6, the frame body 103 of the hydraulic clamp 102 is attached to the upper surface of a flange portion 101*a* of a slide 101 as a fixing side member of a press machine, and an upper metallic mould D is pressed and secured to the lower surface of the flange portion 101*a* in an upward facing state by means of the clamping-member 106. A pressing fixing force for the upper metallic mould D is set as follows. That is, the upper metallic mould D is subjected to lateral processing reaction forces from a work and a lower metallic mould at the time of slide lowering as well as downward subjected to a downward separating reaction force from the work or the lower metallic mould and an inertial force of the upper metallic mould D at the time of slide rising. The pressing force of the hydraulic clamp 102 is so set as to prevent the upper metallic mould D from being occationally moved by means of these reaction forces.

Incidentally, in the conventional embodiment, in order to prevent the upper metallic mould D from dropping due to its own gravity in case that such an accident as lowering an oil pressure within a clamping actuation hydraulic chamber 172 is caused by an oil leakage during a stop of the press working, the piston 116 is kept being upward resiliently urged by means of a backup spring 173 corresponding to the own gravity.

But, it is apprehended that there are the following problems associated with the above-mentioned conventional construction.

When an accident of a vanishment of a pushing up actuation force of the piston 116 is caused by a breakage of a pressurized oil supply hose and so on at the time of slide rising during the press working, the clamping-member 106, the clamp rod 122 and the piston 116 are apt to be pulled down by means of the large separating reaction force downward acting on the upper metallic mould D and the downward inertial force of the upper metallic mould D.

Firstly, the clamping-member 106, the clamp rod 122 and the piston 116 lower due to the pulling down force, so that the clamping-member 106 is changed over from the clamping condition C to the clamping preparation condition B.

Then, in the case that a rotary operation force provided for the rotary member 27 by means of the aforementioned pulling down force is larger than a frictional fixing force between the abutting surfaces of the upper metallic mould D and the clamping-member 106, the rotary member 127 and the clamp rod 122 rotate relative to the non-rotary member 128, so that the clamping-member 106 is changed over from the clamping preparation condition B to the unclamping condition A. As a result, the upper metallic mould D drops from the slide 101. To the contrary, in the case that the frictional fixing force between the abutting surfaces of the upper metallic mould D and the clamping-member 106 is larger than the aforementioned rotary operation force, the rotary actuation device 113 is locked. As a result, it is apprehended that the weakest portion of a transmission system from the clamp rod 122 to the non-rotary member 128 through the rotary member 127 is broken.

SUMMARY OF THE INVENTION

It is an object of the present invention to prevent a drop accident of a fixed member and a breakage accident of a rotary actuation device through a pushing up actuation force of a piston is vanished by any accident.

For accomplishing the aforementioned object, the present invention resides in that a portion for interlockingly connecting the clamp rod and the rotary member is constructed as follows in the above-mentioned basic construction.

The clamp rod is interlockingly connected to the rotary member so as to be rotated and slidably lowered. And under an external disturbance force pulling down condition wherein the pushing up force of the piston is vanished as well as a pulling down external disturbance force is imposed to the clamping-member so that the clamping-member, the clamp rod and the piston are pulled down from the clamping condition, the clamp rod is allowed to lower with the rotary member left behind it.

Incidentally, in the above-mentioned construction, the hydraulic cylinder and the rotary actuation device may be arranged in order from below and also arranged in order from above.

Further, the spiraling engagement between the rotary member and the non-rotary member may be a thread engagement and also a cam engagement comprising a cam groove and a cam.

Furthermore, the piston and the clamp rod may be integrally combined and also separately formed so as to be allowed to be relatively rotated or vertically slid.

The present invention provides the following advantages.

Under the clamping condition of the hydraulic clamp, in the case that the external disturbing pulling down force acts on the clamping-member from the fixed member as well as an accident of a vanishment of the pushing up force of the piston is caused by a breakage of the hydraulic hose and the like, the clamp rod lowers with the rotary member left behind it. Therefore, the clamping-member can be merely changed over from the raised position engaged posture to the intermediate height position engaging posture and is not rotated to the lowered position disengaged posture, so that it becomes possible to prevent the dropping of the fixed member.

Further, since the rotary member is not subjected to the aforementioned external disturbance pulling down force, its breakage can be prevented. In addition thereto, since a necessary strength of the rotary member can be small, the rotary actuation device can be made small in size as well as also the whole hydraulic clamp can be made-small in size.

The above and other objects, advantages and features of the invention will become apparent when considered with the following specification and accompanying drawings wherein:

BRIEF DESCRIPTION OF THE DRAWINGS

FIG. 1 is an operational explanatory view of a hydraulic clamp;

FIG. 1(*a*) is a view showing an unclamping condition;

FIG. 1(*b*) is a view showing a clamping preparation condition;

FIG. 1(*c*) is a view showing a clamping condition;

FIG. 2 is a vertical sectional view of the hydraulic clamp;

FIG. 3 is a sectional view taken along the directed line III—III in FIG. 2;

FIG. 4 is a view taken along the directed line IV—IV in FIG. 2;

DESCRIPTION OF THE PREFERRED EMBODIMENTS

One embodiment of the present invention will be explained with reference to FIGS. 1 through 4 hereinafter.

Firstly, the entire construction of the clamp apparatus will be explained with reference to an operational explanatory view of FIG. 1.

Figures 1A, 1B, 1C:
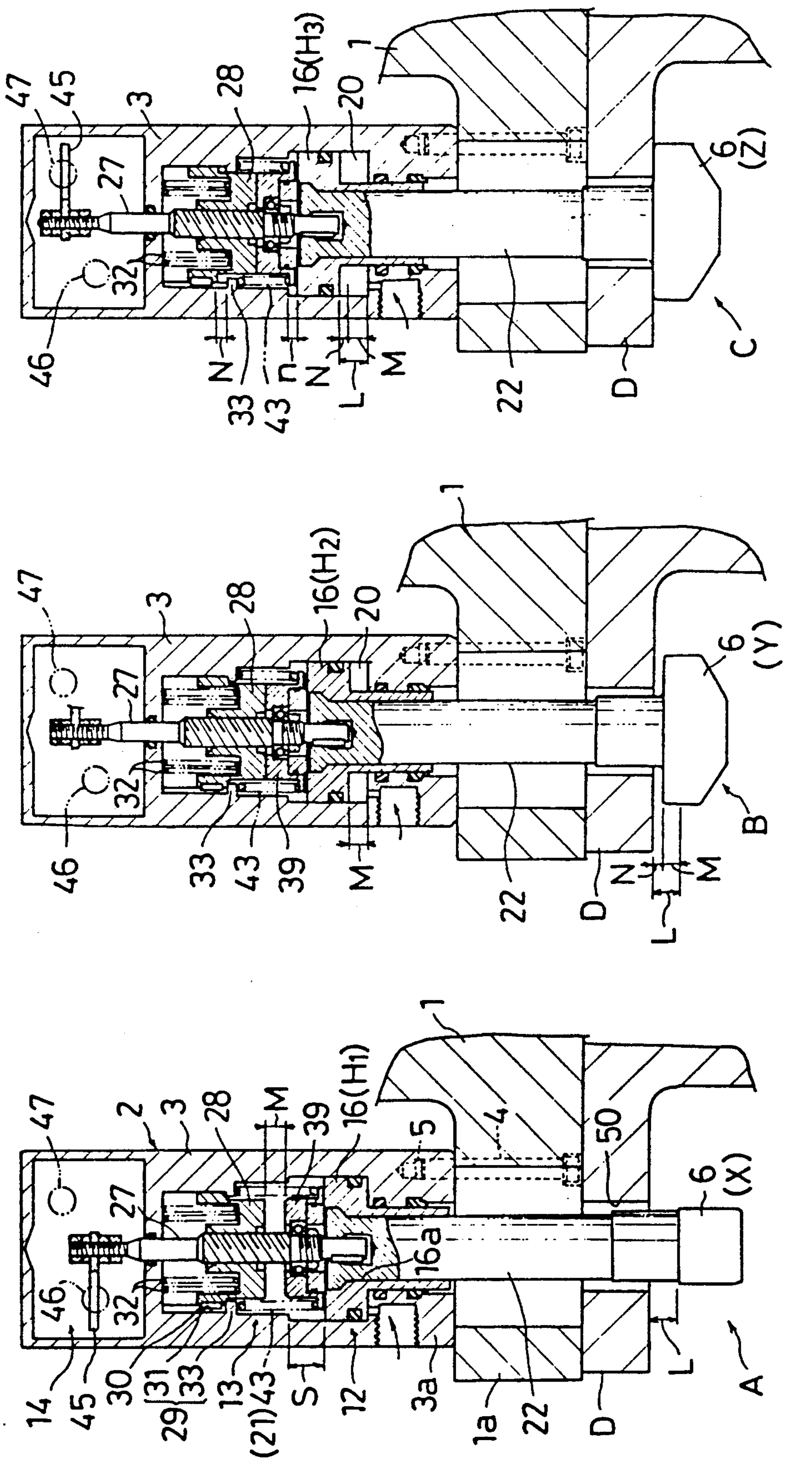
FIGS. 1 through 4 show one embodiment of the present invention.

In FIG. 1(*a*), the symbol 1 designates a slide as a fixing member of a press machine, and a frame body 3 of a hydraulic clamp 2 is attached to the upper surface of a flange portion 1*a* of the slide 1 by means of a plurality of bolts 4. The respective bolts 4 are threadably tightened to bolt holes 5 formed in a lower wall 3*a* of the frame body 3. An upper metallic mould D is adapted to be pressed and secured to the lower surface of the slide 1 in the upward facing state by means of a clamping-member 6 of the hydraulic clamp 2. That is, the clamping-member 6 is so constructed as to be changed over from the unclamping condition A of the lowered position disengaged posture X shown in FIG. 1(*a*) to the clamping condition C of the raised position engaged posture Z shown in FIG. 1(*c*) through the clamping preparation condition B of the intermediate height position engaging position Y shown in FIG. 1(*b*) in order.

Figure 2:
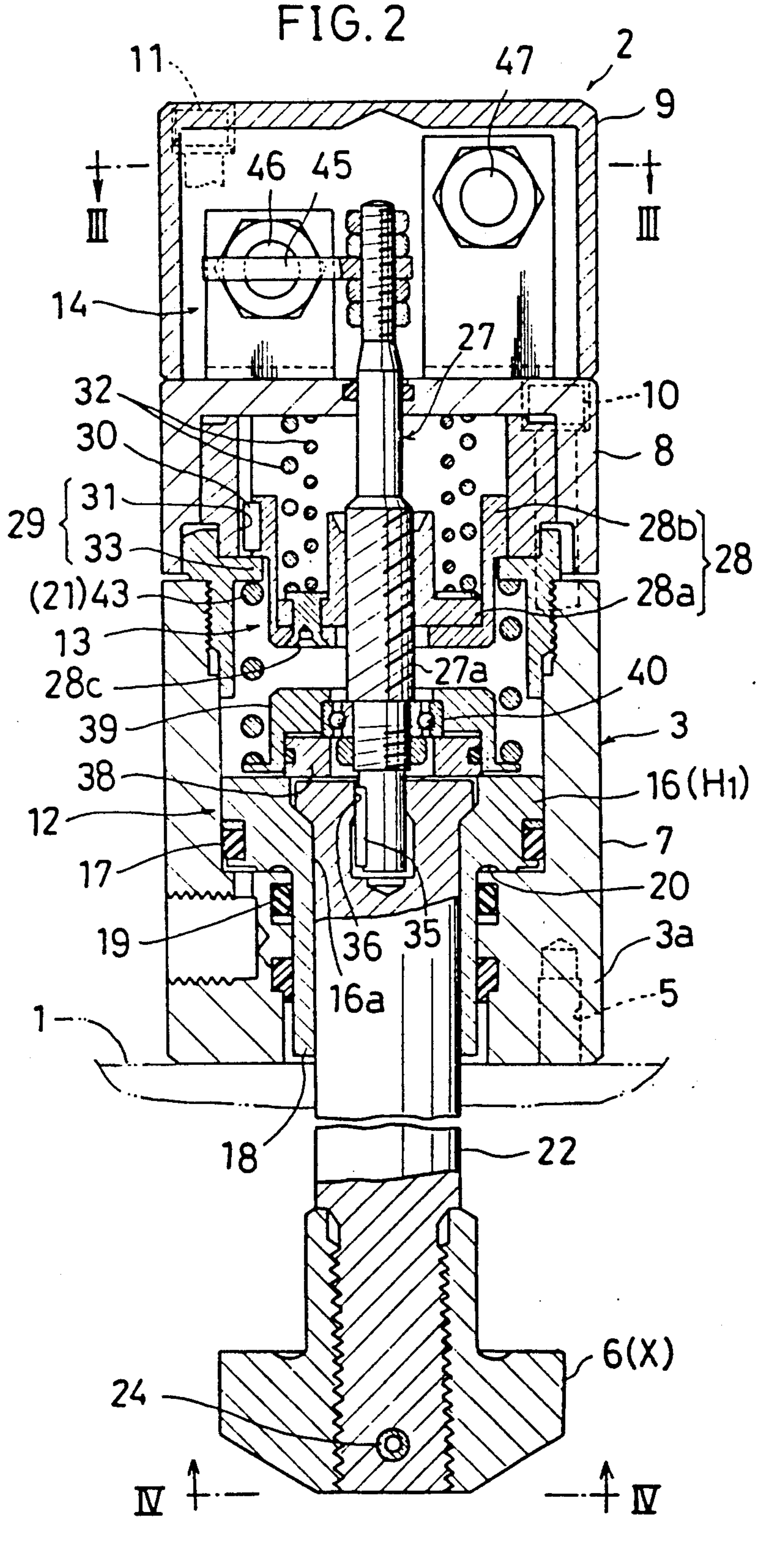
Figure 3:
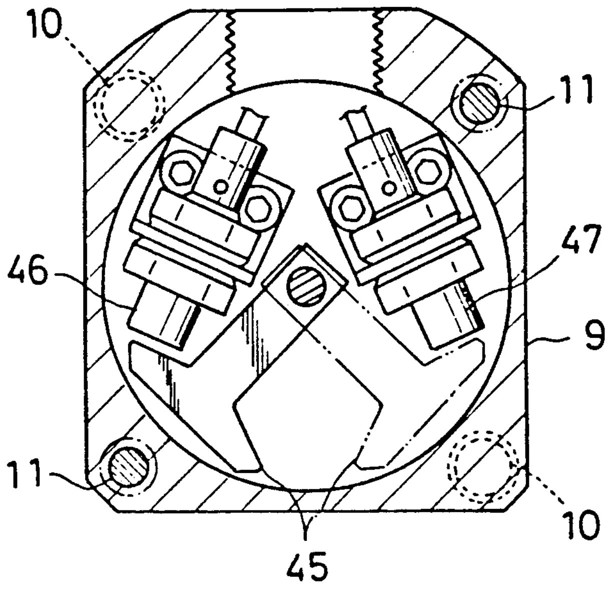
Figure 4:
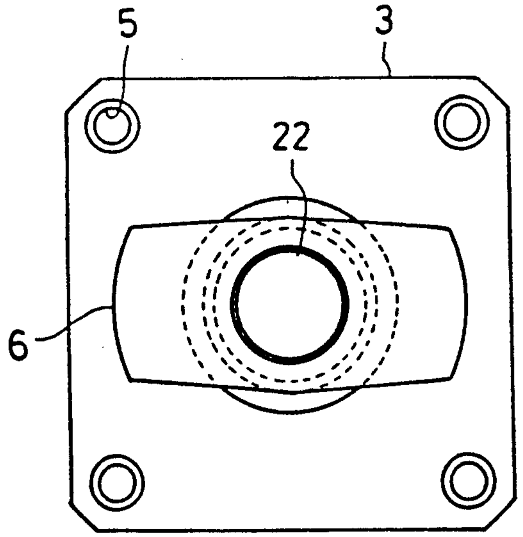

The construction of the aforementioned hydraulic clamp 2 will be explained in detail with reference to FIGS. 2 through 4.

The frame body 3 comprises a lower frame 7, an intermediate frame 8 and an upper frame 9 superimposed in a laminated state in order from below. The intermediate frame 8 is fixedly secured to the lower frame 7 by means of a plurality of bolts 10. The upper frame 9 is fixedly secured to the intermediate frame 8 by means of a plurality of tightening bolts 11. A hydraulic cylinder 12 is disposed in the lower frame 7, a rotary actuation device 13 is disposed in the intermediate frame 8, and a clamping/unclamping condition detecting device 14 is disposed in the upper frame 9 respectively.

The hydraulic cylinder 12 is constructed as the single-acting spring returning type. That is, a piston 16 is inserted into the lower frame 7 so as to be vertically oil-tightly slidable through a first sealing member 17. By sealing a piston rod 18 downward protruded from the piston 16 by means of a second sealing member 19, a clamping actuation hydraulic chamber 20 is formed below the piston 16. A piston returning spring 21 is mounted above the piston 16.

The clamp rod 22 is inserted into a cylindrical bore 16*a* of the piston 16 so as to be rotatably upward driven. The clamp rod 22 is extended below a lower wall 3*a* of the frame body 3, and the clamping-member 6 is threadably secured to the extended portion. The symbol 24 designates a stop pin.

The aforementioned rotary actuation device 13 comprises a rotary member 27 provided with a male threaded portion 27*a* and a non-rotary member 28 provided with a female threaded portion 28*a* both of which are threadably engaged with each other.

The non-rotary member 28 comprises an annular supported portion 28*b* integrally secured to the outside portion of the female threaded portion 28*a* by means of a tightening member 28*c*. The supported portion 28*b* is non-rotatably and vertically slidably guided by a key groove 31 of an inner wall of the intermediate frame 8 through a guide key 30 as well as resiliently urged to the upper surface of a lowering receiving wall 33 by means of a lowering push spring 32. A supporting portion 29 of the non-rotary member 28 is composed of the key groove 31 and the lowering receiving wall 33.

The rotary member 27 is adapted to be rotated together with clamp rod 22 and is interlockingly connected thereto so as to be pushed up by means of the actuation force of the piston 16.

That is, the upper portion of the clamp rod 22 and the lower portion of the rotary member 27 are vertically slidably and relatively non-rotatably engaged with each other by means of a straight movement guiding mechanism comprising a guide key 35 and a key groove 36. Further, the raising actuation force of the piston 16 is transmitted to the rotary member 27 through a first transmission member 38 and a radial bearing 40 in order, as well as a resilient force of a second lowering push spring 43 is imposed thereto 27 through a second transmission member 39. Therefore, the piston 16 and the clamp rod 22 raise the rotary member 27 together therewith at the time of rising, and to the contrary they are allowed to lower with the rotary member 27 left behind them at the time of lowering.

Incidentally, the piston 16 is lowered by means of upper and lower, two lowering push springs 32, 43, and both these spring 32, 43 compose the aforementioned piston returning spring 21.

The aforementioned clamping/unclamping condition detecting device 14 is adapted to detect a rotation position and a height position of a detection arm 45 fixedly secured to the upper portion of the rotary member 27 by means of an unclamping condition detecting switch 46 and a clamping condition detecting switch 47.

The clamping and unclamping operations of the aforementioned hydraulic clamp 2 will be explained with reference to FIG. 1.

A changeover from the unclamping condition A shown in FIG. 1(*a*) to the clamping condition C shown in FIG. 1(*c*) is carried out as follows.

Under the unclamping condition A shown in FIG. 1(*a*), a pressurized oil is discharged from the clamping actuation hydraulic chamber 20 so as to provide a lowered returned condition wherein the piston 16 is pushed to a lowered position $H_1$ by means of the resilient force of the piston returning spring 21, and the clamping-member 6 is changed over to the lowered position disengaged posture X. Thereupon, when the slide 1 of the press machine is lowered, the clamping-member 6 is put through a clamping-member insertion elongated hole 50 of the upper metallic mould D placed on a bolster, from above. Under this condition, there is provided a raising and lowering stroke L between the lower surface of the upper metallic mould D and the clamping surface of the clamping-member 6, and the unclamping condition detection switch 46 detects the unclamping condition A.

When a pressurized oil is supplied to the clamping actuation hydraulic chamber 20, firstly the hydraulic clamp 2 is changed over to the clamping preparation condition B shown in FIG. 1(*b*). That is, until the piston 16 is pushed up to an intermediate height position $H_2$ where the piston 16 has been raised by a rotation stroke M and the second transmission member 39 is brought into contact with the lower surface of the non-rotary member 28, the rotary member 27 is rotated in accordance with the thread engagement with the non-rotary member 28 so as to rotate the clamp rod 22 with being pushed up by means of the actuation force of the piston 16. Thereby, the clamping-member 6 is changed over to the intermediate height position engaging posture Y.

Subsequently, the clamping-member 6 is raised so as to be changed over to the clamping condition C shown in FIG. 1(*c*). That is, the piston 16 is further pushed up by the clamping stroke N from the aforementioned intermediate height position $H_2$ to a raised position $H_3$ so as to simultaneously push up the rotary member 27 and the non-rotary member 28 by means of the actuation force of the piston 16 and to change over the clamping-member 6 to the raised position engaged posture Z.

Under this clamping condition C, there is provided a clamping margin stroke n above the upper surface of the piston 16, and an allowable stroke S of the piston 16 is set to a dimension defined by adding the clamping margin stroke n to the raising and lowering stroke L. An operation control device (not illustrated) of the press machine so constructed as to allow the press machine to operate after the clamping condition C has been detected by means of the clamping condition detecting switch 47.

To the contrary, when the upper metallic mould D is dismounted from the slide 1, the hydraulic clamp 2 is operatively changed over from the clamping condition C shown in FIG. 1(*c*) to the unclamping condition A shown in FIG. 1(*a*).

Firstly, while the hydraulic clamp 2 is kept in the clamping condition C of FIG. 1(*c*), the upper metallic mould D is received on the lower metallic mould on the bolster by lowering the slide 1.

Then, the pressurized oil is discharged from the clamping actuation hydraulic chamber 20. Thereupon, the non-rotary member 28 and the rotary member 27 are lowered by means of the lowering push spring 32, and the piston 16 is lowered by means of a resultant force of the upper and lower lowering push springs 32, 43 as well as the clamp rod 22 lowers together therewith 16. Until the non-rotary member 28 lowers by the clamping stroke N so as to be received by the lowering receiving wall 33, the clamping-member 6 and the clamp rod 22 straightly lower, so that the clamping-member 6 is changed over from the raised position engaged posture Z shown in FIG. 1(*c*) to the intermediate height position engaging posture Y shown in FIG. 1(*b*).

Subsequently, when the lowering push spring 43 on the lower side lowers the rotary member 27 and the piston 16, the rotary member 27 is lowered by the rotation stroke M with being rotated relative to the non-rotary member 28 the lowering of which is prevented by the lowering receiving wall 33. Thereby, the clamping-member 6 is changed over from the intermediate height engaging posture Y shown in FIG. 1(*b*) to the lowered position disengaged posture X shown in FIG. 1(*a*) through the clamp rod 22. Under this unclamping-condition A, similarly there is provided the raising and lowering stroke L between the clamping abutting surfaces of the clamping-member 6 and the upper metallic mould D.

In case that a vanishing accident of the pushing up actuation force of the piston 16 is caused by a breakage of the hydraulic hose connected to the clamping actuation hydraulic chamber 20 when the pulling down force is kept imposed to the upper metallic mould D by a processing reaction force from the work at the time of slide rising in the case that the press working is carried out by changing over the hydraulic clamp 2 having the above-mentioned construction to the clamping condition C shown in FIG. 1(*c*), the pulling down force is apt to pull down the clamping-member 6, the clamp rod 22 and the piston 16 relative to the frame body 3. Accompanying with the action of this pulling down force, the clamping-member 6 lowers with being frictionally secured to the upper metallic mould D and is changed over from the raised position engaged posture Z shown in FIG. 1(*c*) to the intermediate height position engaging posture Y shown in FIG. 1(*b*). Due to the aforementioned pulling down force, the clamping-member 6 and the clamp rod 22 subsequently continuously lower. But, since the rotation of the clamping-member 6 is prevented by means of the frictional securing force of the upper metallic mould D, the clamp rod 22 straightly lowers along the guide key 35 (refer to FIG. 2) with the rotary member 27 left behind it. Thereby, the aforementioned external disturbing pulling down force is not imposed to the rotary member 27.

In that way, since the clamping-member 6 can be merely changed over from the raised position engaged posture Z to the intermediate height position engaging posture Y and is not operatively rotated to the lowered position disengaged posture X when the external disturbing pulling down force is imposed to the clamping-member 6, the dropping of the fixed member D can be prevented. Further, since the rotary member 27 is not subjected to the aforementioned external disturbing pulling down force, the breakage thereof can be effectively prevented.

Incidentally, the above-mentioned embodiment may be modified as mentioned in the following items (a) through (c).

(a) The rotary actuation device 13 may be disposed in the lower space below the piston 16 instead of the upper space above the piston 16.

(b) Contrary to the above-mentioned embodiment, the thread engagement between the rotary member 27 and the non-rotary member 28 may be constructed by providing the female threaded portion in the rotary member 27 as well as the male threaded portion in the non-rotary member 28.

(c) By integrally combining the clamp rod 22 and the piston 16, the rotation and the raising and lowering can be performed together with both these members.

Figure 5:
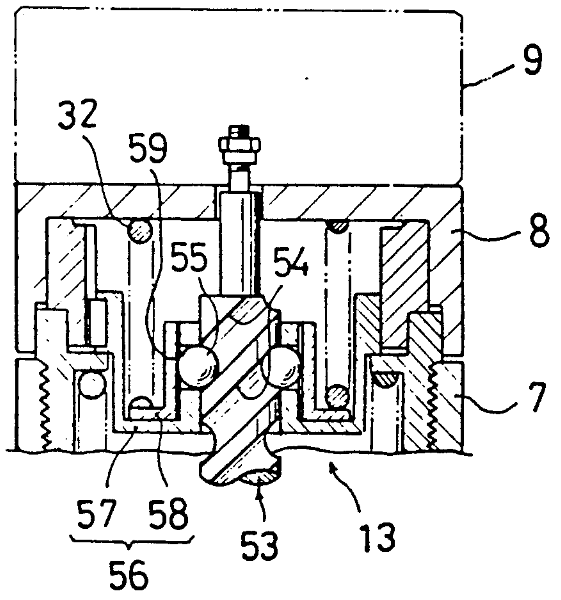
FIG. 5 is a partial view showing a variant, corresponding to FIG. 2.
Figure 6:
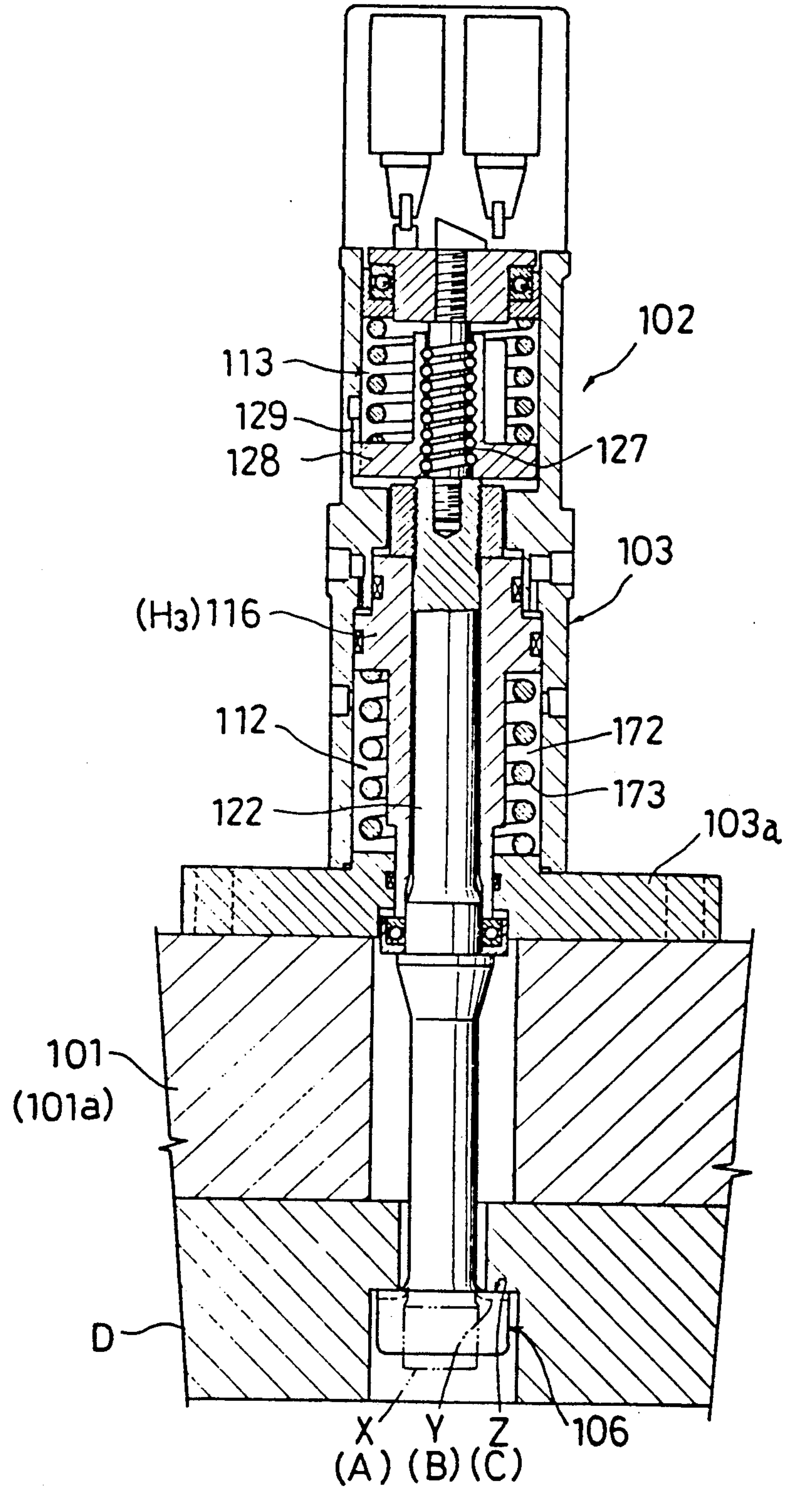
FIG. 6 is a view showing a conventional embodiment corresponding to FIG. 2.

FIG. 5 shows a variant of the above-mentioned embodiment. In this variant, members having the same construction as those in the above-mentioned embodiment are designated with the same symbols in priciple.

In this case, two rows of cam grooves 54 are formed in a rotary member 53 as well as a plurality of steel balls 55 fitted to these cam grooves 54 are provided in a non-rotary member 56. Thereby, the aforementioned spiraling engagement is composed of a cam engagement. The non-rotary member 56 is provided with a supported portion 57 to be guided in the vertical direction with respect to the intermediate frame 8 and a ball-holding barrel 58. The aforementioned respective balls 55 are put in insertion ports 59 of the supported portion 57 and prevented by the ball-holding barrel 58 from being dropped out. The aforementioned lowering pushing spring 32 is mounted between the ball-holding barrel 58 and the upper wall of the intermediate frame 8.

It will be apparent that the invention is not limited to the specifically illustrated and described constructions since variations and modifications may be made without departing from the principles of the invention. For instance, wherever used herein, the terms "upper", "lower", "raising" and "lowering" are only used in describing the preferred embodiment and to indicate opposite ends or direction of movement. Therefore, it is to be understood that the term "lowering", for example, could refer to an upward movement, which direction will be opposite to the "raising" direction.

What is claimed is:

1. In a hydraulic clamp with a direct operated rotary clamping-member, which clamp comprising:

a frame body (3) having a lower wall (3*a*) and being composed of a hydraulic cylinder (12) and a rotary actuation device (13) vertically arranged in series;

a piston (16) of said hydraulic cylinder (12) adapted to be hydraulically actuated from a lowered position ($H_1$) to a raised position ($H_3$) via an intermediate height position ($H_2$);

a clamp rod (22) having an upper portion and a lower portion, said upper portion being connected to said piston (16) as well as said lower portion being extended below the lower wall (3*a*) of said frame body (3);

a clamping-member (6) being fixedly secured to said lower portion of said clamp rod (22);

said rotary actuation device (13) comprising a rotary member (27) fitted to a non-rotary member (28) in a spirally movable state;

said non-rotary member (28) being supported by said frame body (3);

said rotary member (27) being adapted to be pushed up by means of a hydraulic actuation force of said piston (16) and to be interlockingly connected to said clamp rod (22) in the rotatably actuated state such that said clamp rod (22) rotates in unison with said rotary member (27);

when said piston (16) is located at the lowered position ($H_1$), said clamping-member (6) being adapted to take an unclamping condition (A) of a lowered position disengaged posture (X);

when said piston (16) is pushed up from the lowered position ($H_1$) to the intermediate height position ($H_2$), said rotary member (27) being rotated in accordance with a spiraling engagement with said non-rotary member (28) to rotate said clamp rod (22) while being pushed up by means of the actuation force of said piston (16), so that said clamping-member (6) is changed over from said unclamping condition (A) to a clamping preparation condition (B) of an intermediate engaging posture (Y); and when said piston (16) is pushed up from said intermediate height position ($H_2$) to the raised position ($H_3$), said rotary member (27) and said non-rotary member (28) being simultaneously pushed up by means of the actuation force of said piston (16), so that said clamping-member (6) is actuated from said clamping preparation condition (B) to a clamping condition (C) of a raised position engaged posture (Z);

the improvement comprising:

means for interlockingly connecting said clamp rod (22) to said rotary member (27) such that said clamp rod (22) rotates in unison with said rotary member (27) but can slide relative thereto; and wherein, when said clamping-member (6) is acted upon by a force tending to move said clamping-member (6) to said unclamping condition (A), which force is greater than the hydraulic actuation force of said piston (16), said clamping-member (6) and said clamp rod (22) can slide relative to said rotary member (27) toward said unclamping condition (A).

2. A hydraulic clamp as set forth in claim 1, wherein said rotary actuation device (13) is disposed above said piston (16).

3. A hydraulic clamp as set forth in claim 2, wherein said clamp rod (22) is formed as a separate component part relative to said piston (16), and this clamp rod (22) is inserted into a cylindrical bore (**16*a*) of said piston (16**).

4. A hydraulic clamp as set forth in claim 3, wherein said rotary member (27) is rotatably supported by a bearing (40) relative to said piston (16).

5. A hydraulic clamp as set forth in claim 4, wherein said hydraulic cylinder (12) is formed as the single-acting spring returning type, the pushing up hydraulic actuation force of said piston (16) is adapted to be transmitted to said rotary member (27) through a first transmission member (38) and said bearing (40) in order, and a resilient force of a piston returning spring (21) is adapted to be transmitted to said piston (16) through a second transmission member (39), said bearing (40) and said first transmission member (38) in order.

* * * * *